United States Patent
Meulenberg et al.

(10) Patent No.: US 8,506,678 B2
(45) Date of Patent: Aug. 13, 2013

(54) POWER PLANT THAT USES A MEMBRANE AND METHOD FOR OPERATING THE SAME

(75) Inventors: Wilhelm Albert Meulenberg, AA Vijlen (NL); Stefan Baumann, Aachen (DE); Ludger Blum, Juelich (DE); Ernst Riensche, Juelich (DE)

(73) Assignee: Forschungszentrum Juelich GmbH, Juelich (DE)

( * ) Notice: Subject to any disclaimer, the term of this patent is extended or adjusted under 35 U.S.C. 154(b) by 380 days.

(21) Appl. No.: 12/734,682

(22) PCT Filed: Oct. 29, 2008

(86) PCT No.: PCT/DE2008/001763
§ 371 (c)(1), (2), (4) Date: Jun. 3, 2010

(87) PCT Pub. No.: WO2009/065374
PCT Pub. Date: May 28, 2009

(65) Prior Publication Data
US 2010/0263377 A1    Oct. 21, 2010

(30) Foreign Application Priority Data
Nov. 23, 2007 (DE) .................. 10 2007 056 841

(51) Int. Cl.
*B01D 53/22* (2006.01)

(52) U.S. Cl.
USPC ................ 95/54; 60/39.52; 95/43; 95/45

(58) Field of Classification Search
USPC .................. 60/39.52; 95/43, 45, 54
See application file for complete search history.

(56) References Cited

U.S. PATENT DOCUMENTS 3,699,903 A * 10/1972 King .................... 110/345
5,724,805 A * 3/1998 Golomb et al. .......... 60/783

(Continued)

FOREIGN PATENT DOCUMENTS

| EP | 1 172 135 | 1/2002 |
|----|-----------|--------|
| EP | 1 952 874 | 8/2008 |

OTHER PUBLICATIONS

Perry, R.H.; Green, D.W. (1997). Perry's Chemical Engineers' Handbook (7th Edition). (pp: 22-64). McGraw-Hill.*

*Primary Examiner* — Jason M Greene
*Assistant Examiner* — Anthony Shumate
(74) *Attorney, Agent, or Firm* — Jordan and Hamburg LLP

(57) ABSTRACT

Provided is a power plant for generating electrical energy comprising a combustion chamber for producing steam, at least one downstream flue gas purification stage, a separation stage for $CO_2$, a recycling circuit for the flue gas, and a high-temperature $O_2$ membrane, which is connected upstream of the combustion chamber. The high-temperature $O_2$ membrane has an inlet and an outlet on the feed side which are thermally coupled by way of a heat exchanger. On the permeate side, the high-temperature $O_2$ membrane has only an outlet which is connected to the combustion chamber and/or the flue gas recycling circuit and a means for cooling and/or compression which is disposed in this outlet. The power plant, in which coal is burned using substantially pure oxygen, and in which the combustion waste gas is purified and partially recirculated to the combustion process, is operated in such a way that the oxygen that is used is obtained by separation from air using a high-temperature $O_2$ membrane, wherein the membrane is operated with atmospheric air at a pressure of up to 2 bar on the feed side and a negative pressure of between 0.02 and 0.5 bar is applied on the permeate side.

4 Claims, 3 Drawing Sheets

(56) References Cited

U.S. PATENT DOCUMENTS

| | | | |
|---|---|---|---|
| 5,753,007 A | 5/1998 | Russek et al. | |
| 6,063,355 A * | 5/2000 | Fujimura et al. | 423/359 |
| 6,148,602 A * | 11/2000 | Demetri | 60/775 |
| 6,382,958 B1 | 5/2002 | Bool, III et al. | |
| 6,436,337 B1 * | 8/2002 | Gross | 266/242 |
| 6,505,567 B1 * | 1/2003 | Aderson et al. | 110/344 |
| 6,868,677 B2 * | 3/2005 | Viteri et al. | 60/784 |
| 7,118,606 B2 * | 10/2006 | Labinov et al. | 48/127.9 |
| 2002/0073844 A1 | 6/2002 | Bool, III et al. | |
| 2002/0174659 A1 * | 11/2002 | Viteri et al. | 60/780 |
| 2002/0180122 A1 * | 12/2002 | Gross | 266/82 |
| 2004/0001788 A1 * | 1/2004 | Marin et al. | 423/210 |
| 2004/0002030 A1 | 1/2004 | Shah et al. | |
| 2004/0011057 A1 * | 1/2004 | Huber | 60/781 |
| 2004/0016237 A1 * | 1/2004 | Marin et al. | 60/783 |
| 2004/0128975 A1 * | 7/2004 | Viteri | 60/39.55 |
| 2004/0170935 A1 * | 9/2004 | Lebas et al. | 431/2 |
| 2005/0210881 A1 * | 9/2005 | Balan et al. | 60/780 |
| 2006/0003207 A1 * | 1/2006 | Balan et al. | 429/26 |
| 2008/0176174 A1 | 7/2008 | White et al. | |
| 2012/0060728 A1 * | 3/2012 | Nazarko et al. | 110/345 |

* cited by examiner

POWER PLANT THAT USES A MEMBRANE AND METHOD FOR OPERATING THE SAME

This is a 35 USC 371 national stage filing based on PCT application PCT/DE2008/001763.

This application has priority to DE 10 2007 056 841.1

The invention relates to a power plant and to a method for operating this power plant. The power plant is a membrane power plant comprising a high-temperature $O_2$ membrane.

BACKGROUND OF THE INVENTION

The separation of $CO_2$ from typical coal power plant processes can, in principle, be achieved using three different concepts.

Post-Combustion Capture:

In this case, a conventional steam power plant is fed coal and air. Then, a conventional flue gas purification step follows. The $CO_2$ is separated from the flue gas after combustion by using suitable scrubbing steps or, in the longer term, by membrane systems. The disadvantage of this method is that high volume flows of flue gas must be purified with relatively low $CO_2$ concentrations. Membranes for separating the $CO_2$ therefore have high membrane surface requirements. Typical process parameters for the flue gas to be treated would be 1000 $m^3/s$ with 18% by volume $CO_2$.

Pre-Combustion Capture:

This method is based on an IGCC (integrated gasification combined cycle) process, wherein the separation of $CO_2$ is carried out in an intermediate step after coal gasification or natural gas reformation, and after the gas purification and gas conditioning (CO shift) steps, but before the combustion step using air. The different coal gasification methods developed so far are preferably operated with oxygen or enriched air (and steam) at a pressure of approximately 20 to 30 bar. For this reason, coal gas has two crucial advantages with respect to $CO_2$ separation. For one, the real volume flow, at a low nitrogen level and high pressure, is approximately 100 times lower than for the flue gases of conventional steam power plants. The direct result is high partial pressures for the main components, CO and $H_2$.

After additional CO conversion into $CO_2$ and $H_2$ by supplying steam (shift reactor) in order to condition the carbon gas for $CO_2$ separation, two options are available, which are the separation of $CO_2$, such as by way of a scrubber, or the separation of a sufficient quantity of $H_2$ using a membrane, wherein gas that is rich in $CO_2$ and suited for liquefaction and storage remains in the retentate. With both options, the hydrogen can subsequently be turned into electric energy in a gas and steam power plant (gas combined cycle), for example, by using an $H_2$ turbine. Typical process parameters after the gas purification would be 10 $m^3/s$ with 45% by volume $CO_2$.

Oxyfuel Process:

In this case, simple $CO_2$ separation is carried out by way of condensation after combustion of the coal in a boiler using pure oxygen and a subsequent step of flue gas purification. This method has a crucial advantage. The only combustion products resulting from a combustion process in pure oxygen are $CO_2$ and water vapor, which can be easily separated from $CO_2$ by condensation as the gas mixture cools. The $CO_2$ and water vapor are advantageously recycled in a circuit and recirculated to the boiler together with the oxygen flow. The pure oxygen can either be generated by conventional cryogenic air separation or by using an $O_2$ membrane, wherein the returned (circulated) $CO_2$/water vapor mixture can serve as a flushing gas.

In all three cases, however, no well-functioning concept yet exists for the specific $CO_2$ separation.

High-temperature $O_2$ membranes reportedly have tremendous development potential, particularly in terms of energy. As a condition for this, cost-effective membranes must be available.

For these applications, so-called dense mixed conductors, such as perovskite, may be used. In these, the $O_2/N_2$ gas separation is not effected by the separating action of pores, but by the special transport mechanisms in the bulk material. Oxygen ions migrate in the direction of the concentration gradients thereof. On the membrane surface, the electrons leave the oxygen ion and migrate back.

The challenges in the development of the membrane and membrane module as well as in the development of the concept are to achieve the highest degree of separation possible, the highest purity of separated components possible, and the lowest energy expenditure possible during the conditioning of the feed gas and the permeate flow, such as by increasing pressure or using a vacuum. This is intended to achieve low losses in net efficiency, while at the same time achieving the highest flow density possible for the permeating component. At the same time, focus is placed on low surface requirements for the membrane and the lowest apparatus-related costs in the membrane surroundings, thus requiring little additional investment costs. Finally, the desire is to create a module and method concept, which also meets strict requirements in terms of stability and service life, in light of the high operating temperatures.

These requirements are very complex and, in part, contradictory. As a result, high demands in the form of high permeability and selectivity are placed on the membranes used, as well as on the process engineering, in terms of providing favorable process conditions in an optimal membrane separating process, with low additional process engineering costs.

In the problem stated, three fundamental boundary conditions must notably be observed:

1. Non-porous, dense mixed-conductive $O_2$ membranes are subject to a law (Wagner equation), according to which the local $O_2$ permeate flow densities are proportional to the natural logarithm of the particular partial pressure conditions of the permeating component, that is $O_2$ (feed side/permeate side of the membrane). Only in the case of extremely thin membranes are surface effects added to this bulk transport mechanism, whereby the dependency on the pressure conditions is less pronounced.

2. As differs from porous membranes, no special measures are required with respect to the required purity of the $O_2$ product flow, because the $O_2/N_2$ selectivity of dense, mixed-conductive membranes is excellent by nature, and is about 100:1 or higher.

3. The inevitably high membrane operating temperature, which is typically 800° C., is a particular challenge with respect to the design and concept. This is further exacerbated for power plant designs that are directed at achieving pressurized operation of the high-temperature membrane and the high-temperature heat exchangers of the membrane surroundings.

As no membrane power plant exists to date, the prior art consists of no more than conceptual proposals in the literature. The concept developments are still in the early stages. The literature discloses basic circuits, however in each case only a single special membrane is examined. Likewise, in graded processes, only one membrane is used for the separations to be carried out on the particular gas flows in the cascade stages. With this individual membrane, the partial pressure of the permeating component decreases continuously, but the feed pressure and permeate pressure are constant over the entire membrane length, unless a flushing gas is used. These pressures can optionally be adjusted by way of a compressor or vacuum pump.

The following concept is known from the prior art for an oxyfuel power plant technology having conventional $O_2$ separation from the air, which is the so-called cryogen air separation plant (LZA) by Vattenfall. Presently, a 30 MWth plant is under construction. FIG. 1 shows a schematic diagram of such an oxyfuel power plant having an upstream air separation system.

In the oxyfuel process, coal is not burned with air, but in an atmosphere of pure oxygen and recycled flue gas. Ash is precipitated in the following treatment steps, as in the conventional power plant process. The fly ash is then separated by dedusting. In the oxyfuel process, a large portion, up to 75% of the flue gas produced during combustion, is recirculated to the boiler in the form of $CO_2$ and water vapor. Sulfur compounds are extracted from the flue gas flow in the form of gypsum as by-products by way of desulfurization. Finally, the remaining water vapor that was added with the coal is condensed out, so that the remaining flue gas comprises almost exclusively pure $CO_2$. The carbon dioxide can then be compressed to more than 100 bar for further use and/or storage.

The disadvantage of this concept is the high energy requirement of the cryogenic air separation system (LZA), whereby a loss of efficiency of at least 10 percentage points (including $CO_2$ liquefaction) is to be expected. A brown coal power plant according to the present state of the art, for example, has a net efficiency of 43%. If, based on this technology, one were to employ the oxyfuel process with the cryogenic air separation system, an efficiency of only 35% would be likely.

A possible variant of the oxyfuel power plant technology with the $O_2$ membrane is presently under development in the OXYCOAL-AC project. A characteristic feature is the membrane mode of operation, using two process engineering measures in order to achieve high propulsive forces for the permeate flow. First, the air on the feed site is compressed to approximately 20 bar in order to increase the $O_2$ partial pressures to approximately 2 to 4 bar, and secondly, flue gas flushing is used in the counter-current on the permeate side (1 bar) in order to lower the $O_2$ partial pressures (approximately 30-300 mbar). This creates the advantage of high local $O_2$ partial pressure conditions of typically 13:1 (4 bar/0.3 bar) or higher.

On the other hand, the pressurized operation and the flue gas membrane flushing result in a number of disadvantages, which can be listed as follows:
- two large volume flows must both enter the membrane at the membrane operating temperature, because otherwise the membrane temperature cannot be maintained;
- hot flue gas recirculation causes a high recirculated volume flow, because the cooling effect is generally not effective;
- hot gas purification is required;
- the high pressure gradient between the feed side and permeate side of the membrane results in very high stability requirements for the membrane module;
- the high pressure gradient between the feed side and permeate side of the membrane results in very high stability requirements for the high-temperature recuperative heat exchanger used for air preheating;
- the residues of the combustion products reach the permeate side of the membrane;
- the $CO_2$ atmosphere on the permeate side limits the membrane selection, for example, barium-containing perovskite membranes exhibit the highest $O_2$ flow densities, but have stability problems in a $CO_2$ atmosphere.

SUMMARY OF THE INVENTION

It is the object of the invention to provide a process for operating an oxyfuel power plant having an $O_2$ membrane, which overcomes the disadvantages described above, which is to say that it results in the lowest possible apparatus-related cost in the membrane surroundings. The basic requirements for the process remain, such as the highest possible degree of separation of $CO_2$ from the flue gas, and the highest possible purity of the separated component at the lowest possible energy expenditure, which is to say, the highest possible net efficiency.

In addition, the method of the separating process is to enable the highest possible flow density for the permeating component. Additionally, it is an object of the invention to create an apparatus that is suited for carrying out said method.

The objects of the invention are achieved by a method for operating an oxyfuel power plant having a high-temperature $O_2$ membrane according to the main claim and by an apparatus according to the additional independent claim. Advantageous embodiments of the method and the apparatus are disclosed in the dependent claims.

SUBJECT MATTER OF THE INVENTION

The invention is based on the concept of the oxycoal process, wherein coal is burned using pure oxygen, the waste gas is purified in the hot state, and the $CO_2$ is separated after cooling, while the remaining hot flue gas is fed to a high-temperature $O_2$ membrane. The necessary oxygen is obtained by separation from compressed air by way of this membrane. The flue gas enriched with oxygen is subsequently once again recirculated to the combustion process.

Unlike in the process described above, however, the following mode of operation is proposed. The feed side of the $O_2$ membrane is operated with atmospheric air. Preheating is carried out by recuperation over nearly the entire temperature range, typically in the range of 20 to 750° C. Usually, only a small amount of natural gas must be supplied for final preheating from approximately 750 to 800° C. As an alternative, final preheating of the air could take place in the steam generator. From a present-day perspective, useful membrane temperatures range between 700 and 1000° C.

Flushing of the membrane on the permeate side with recirculated flue gas is eliminated, because this gas generally comprises residues of combustion products from the coal burning process, which could be disadvantageous for the membrane.

According to the invention, the permeate side is accordingly subjected to a vacuum, in order to achieve lower $O_2$ partial pressures on this membrane side during operation than on the feed side. On a large scale, for example, a vacuum pressure level of 30 mbar can be generated using a conventional vacuum pump. The oxygen is then conducted into the oxyfuel block at atmospheric pressure (1 bar).

Compared to the OXYCOAL-AC concept, the mode of operation according to the invention disadvantageously results in lower $O_2$ partial pressures at the membrane, typically in the range of 3:1 to 7:1, instead of the conditions of approximately 13:1 and 67:1 occurring otherwise.

However, with the invention, it is advantageously possible to eliminate all of the technical problems associated with the concept described above, using pressurized operation and membrane flue gas flushing. The air can now be preheated in a simple manner over nearly the entire temperature range by way of recuperation (typically 20-750° C.), at uniform pressure levels for the inflowing and outflowing air. In the case of the membrane power plant designs using pressurized operation on the feed side of the membrane, a subsequent automatic expansion exists, which results in cooling. In these cases, a different major heat source must be found or provided, for example, hot recirculated flue gas or coal combustion directly in the steam generator.

In the vacuum range of the gas circulation, unacceptably high pressure losses are not a problem that must be feared, because the $O_2$ gas volume is lower than the air volume by a factor of approximately 10. The $O_2$ generation is now no longer substantially integrated in the oxyfuel combustion process. For the development of the overall power plant, this means:

1. The $O_2$ membrane block can be developed separately, with only the membrane module not yet being available today.
2. After development of the oxyfuel block, such as by VATTENFALL (initially using the air separation system), this can be combined into an oxycoal membrane power plant, with only available power plant components being adapted to each other.

The extraction of $O_2$ by way of a vacuum pump is comparable to the extraction of $CO_2$ in the post-combustion power plant using a $CO_2$ membrane at the cold flue gas end. Initial estimates for the energy requirement of the vacuum pump, for example, indicate that the efficiency losses (including $CO_2$ liquefaction) will be approximately 6% (vacuum pump and $CO_2$ liquefaction approximately in equal portions).

DESCRIPTION OF THE PREFERRED EMBODIMENTS

The invention will be described in more detail hereinafter based on figures and exemplary calculations, without thereby limiting it to the embodiments mentioned above.

Figure 1:
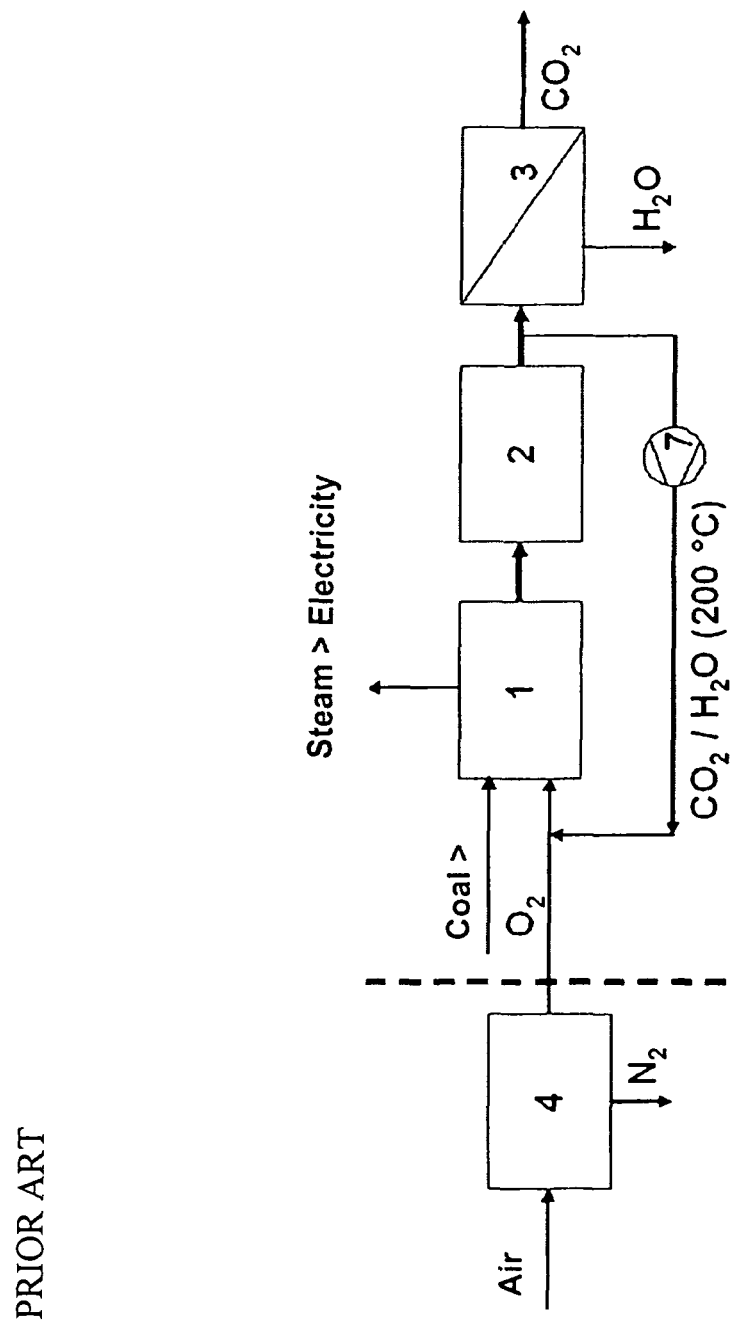
FIG. 1 shows the concept of the oxyfuel process.
Figure 2:
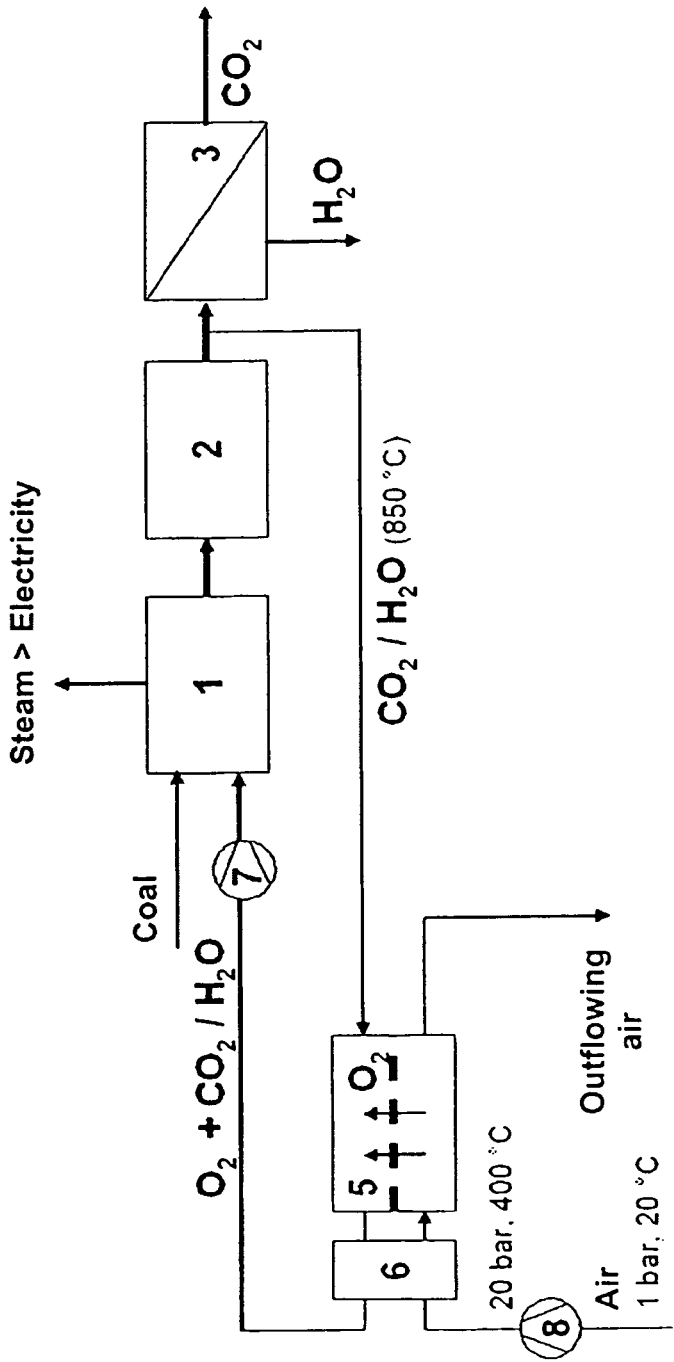
FIG. 2 shows the oxycoal process.
Figure 3:
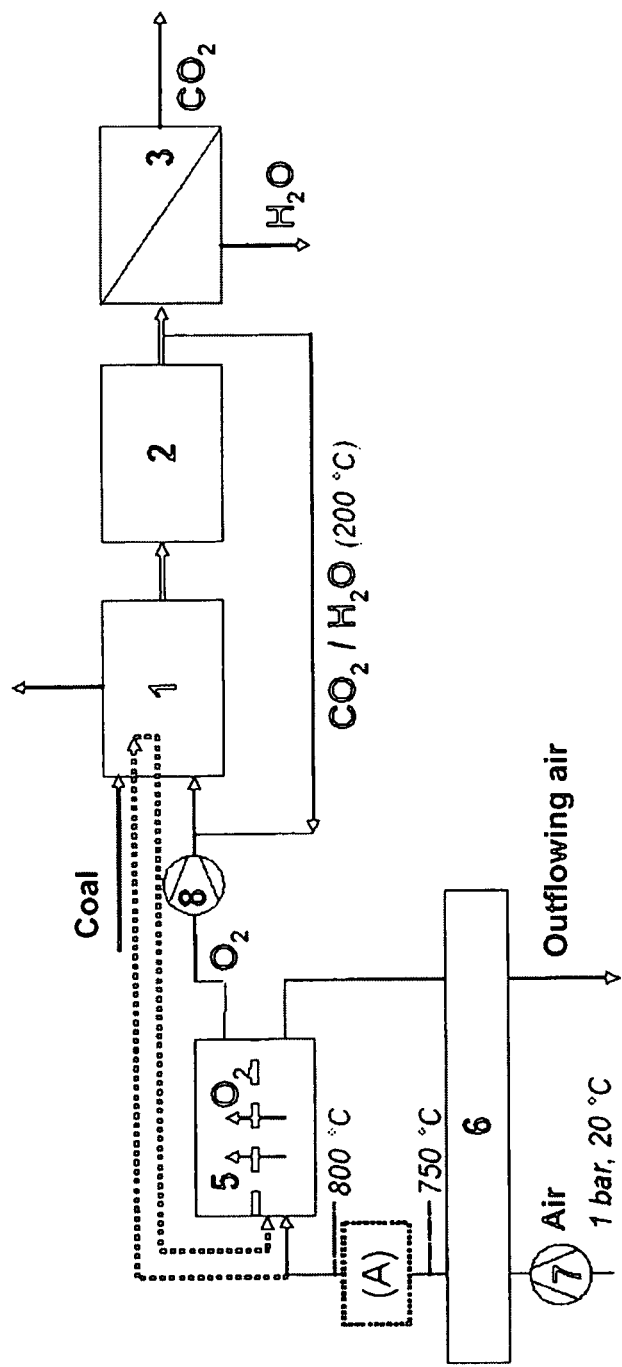
FIG. 3 shows the concept of the mode of operation of a coal-operated power plant according to the invention.

In FIGS. 1 to 3 the following meanings apply:
1 Steam boiler,
2 Purification of the waste gas, generally comprising dedusting and removal of nitrogen,
3 Condensation of the flue gas,
4 Air separation system
5 High-temperature $O_2$ membrane (OTM=oxygen transport membrane)
6 Recuperative heat exchanger
7 Circulation fan
8 Compressor, vacuum pump
(A) Optional heater, such as a burner FIG. 1 shows the concept of the oxyfuel process. The coal is burned in an atmosphere comprising pure oxygen and recycled flue gas in the combustion boiler (1). Electricity is produced from the steam that is generated. The combustion waste gas is dedusted and nitrogen is removed in the subsequent purification steps (2). The majority of the flue gas produced during combustion is recirculated into the combustion boiler (1) in the form of $CO_2$ and water vapor at temperatures around 200° C. The remaining water vapor that was added with the coal is condensed out (3), so that approximately pure $CO_2$ can be separated. The oxygen that is used is generated cryogenically in an air separation system (4).

FIG. 2 illustrates the oxycoal method. Again, the coal is burned in an atmosphere comprising pure oxygen and recycled flue gas in the combustion boiler (1). Electricity is produced from the steam that is generated. The combustion waste gas is dedusted and nitrogen is removed in the hot stage in the subsequent purification steps (2). The flue gas, however, is recirculated in the form of $CO_2$ and water vapor to a high-temperature $O_2$ membrane (5), in which the flue gas is enriched with oxygen. The oxygen is extracted from the air, which is initially compressed to 20 bar using a compressor (8). The air is heated to approximately 400° C. in the process. A recuperative heat exchanger (6) preheats the air that is supplied to the high-temperature $O_2$ membrane to approximately 750° C. using the flue gas exiting the membrane. The depleted air is expanded again and discharged. The flue gas enriched with oxygen is returned to the combustion boiler (1).

The disadvantage is that large amounts of gas to be purified are produced during the hot flue gas recirculation. The heat exchanger must be designed for pressures of up to 20 bar and for differential pressures of up to 19 bar. In addition, it is a disadvantage that, together with the flue gas, combustion products reach the oxygen membrane, and the high $CO_2$ portion in the flue gas also has a limiting effect on the membrane selection.

The following standard values can be provided as examples of the conditions in the high-temperature $O_2$ membrane:

| | | | | |
|---|---|---|---|---|
| $p_{O_2}^{Feed}$ | 4 | 3 | 2 | bar |
| $p_{O_2}^{Permeat}$ | 0.3 | 0.15 | 0.03 | bar |

The ratio of the oxygen partial pressures ($p_{O_2}^{feed}$ zu $p_{O_2}^{permeat}$) in the membrane ranges between 10:1 and 80:1, and notably, high values in the permeate outlet region of between 15:1 and 20:1 are considered to be particularly advantageous.

FIG. 3 illustrates the concept of the mode of operation of a coal-operated power plant according to the invention. In a manner similar to that of the oxycoal process, a high-temperature $O_2$ membrane (5) is used for generating the required oxygen. In order to avoid the disadvantages described above, however, the flue gas is recirculated to the combustion chamber (1) directly after purification at a temperature of approximately 200° C., in a manner similar to that of the oxyfuel process.

One of the differences, as compared to the prior art described above, is that the air is supplied on the feed side of the high-temperature $O_2$ membrane (5) at atmospheric pressure, and that a negative pressure is automatically adjusted on the permeate side for the oxygen transfer. In this way, pure oxygen is produced on the permeate side, which subsequently, after cooling and compression, is supplied directly to the combustion chamber, or, as an alternative, first to the recycled flue gas. The preheating of the air is again achieved by heat transfer (6) from the air exiting the membrane, but here further preheating by an external burner (7) as well as preheating directly by the combustion chamber (1) can also optionally be performed.

The following standard values can be provided as examples for the conditions in the transport membrane during this mode of operation for an oxycoal membrane power plant using a high-temperature $O_2$ membrane having a permeate vacuum (OXYVAC-JÜL).

The ratio of the oxygen partial pressures ($p_{O_2}^{feed}$ zu $p_{O_2}^{permeat}$) in the membrane should advantageously range between 10:1 and 2:1, and values between 7:1 and 3:1 are considered to be particularly advantageous.

| | | | |
|---|---|---|---|
| $p_{O_2}^{Feed}$ | 200 | 100 | mbar |
| $p_{O_2}^{Permeat}$ | 30 | 30 | mbar |

In order to estimate possible permeate flow densities with respect to the membrane surface requirement, exploratory measurements were conducted on a barium-containing perovskite BSCF5582 (thickness 1 mm, no substrate). The vacuum pressure of 30 mbar was approximately simulated by adjusting to $O_2$ partial pressures of approximately 30 mbar using helium flushing gas. An $O_2$ flow density of 2 $Nm^3/m^2h$ was measured. This is already within the range of the target value (6 $Nm^3/m^2h$).

This target value appears achievable by reducing the membrane thickness as well as by optionally reducing any existing major surface resistance, which will dominate when the thickness is reduced, by way of roughening and/or doping using catalytically active substances.

Finally, in order to illustrate the technical and economical potential of this membrane power plant technology, a simple estimation will be provided. For a 1000 M oxycoal power plant ($O_2$ requirement of approximately 200 kg/s, or 140 $Nm^3/S$, or 500,000 $Nm^3/h$), a membrane surface of 100,000 $m^2$ is required for a target $O_2$ flow density value of 5 $Nm^3/m^2h$. In Germany, the total power plant output is approximately 100 GW. If these power plants were replaced by oxycoal power plants and the membrane surface were related to the population, the following $O_2$ membrane surface and mass requirements would be obtained (for a membrane thickness of approximately 1 mm):

approximately 0.1 $m^2$/inhabitant approximately 0.5 kg/inhabitant

Since the power plant output is approximately 1 kw/inhabitant, the same numbers are obtained for the $O_2$ membrane with respect to 1 kW (power plant output):

approximately 0.1 $m^2$/kW and approximately 0.5 kg/kW.

Membrane manufacturers estimate the investment costs for these ceramic membranes to be approximately € 1000/$m^2$ for prototypes and € 200/$m^2$ for mass production. For a 1000 MW power plant with an investment amount of approximately € 1 billion, approximately € 20 million would be added for the membrane module, plus the investment costs for the heat exchanger, vacuum pumps, $CO_2$ compressor and $CO_2$ pipeline, for example.

The invention claimed is:

1. A method for operating a power plant, comprising burning coal in a combustion process using substantially pure oxygen, partially recirculating combustion waste gas to the combustion process, obtaining the oxygen that is used by separation from air using a high-temperature $O_2$ membrane that receives to the feed side of the membrane oxygen with atmospheric air at a pressure of up to 1 bar and applying on the permeate side of the membrane a negative pressure of between 0.02 and 0.5 bar, inclusive.

2. The method according to claim 1, comprising operating on the feed side of the membrane with atmospheric air up to 1 bar and applying on the permeate side a negative pressure between 0.02 and 0.1 bar, inclusive.

3. The method according to claim 1 comprising adjusting the negative pressure with the help of a vacuum pump.

4. A method according to claim 1, comprising preheating the air with a heat exchanger and using the waste air removed from the high-temperature $O_2$ membrane.

* * * * *